United States Patent [19]

Okado

[11] 4,236,201
[45] Nov. 25, 1980

[54] INVERTER DEVICE
[75] Inventor: Chihiro Okado, Fuchu, Japan
[73] Assignee: Tokyo Shibaura Denki Kabushiki Kaisha, Kawasaki, Japan
[21] Appl. No.: 954,886
[22] Filed: Oct. 24, 1978
[30] Foreign Application Priority Data

Oct. 27, 1977 [JP] Japan .................................. 52-128105

[51] Int. Cl.³ ............................................. H02M 1/06
[52] U.S. Cl. ...................................... 363/138; 363/28
[58] Field of Search ..................................... 363/27–28, 363/135–138, 37; 307/252 M

[56] References Cited

U.S. PATENT DOCUMENTS

| | | | |
|---|---|---|---|
| 3,219,905 | 11/1965 | Davis et al. ........................... | 363/138 |
| 3,388,310 | 6/1968 | Etter ...................................... | 363/135 |
| 3,612,973 | 10/1971 | Kuniyoshi ........................... | 363/137 X |
| 3,781,644 | 12/1973 | Yatsuk ................................... | 363/138 |
| 4,019,117 | 4/1977 | Gehm et al. ......................... | 363/138 |

FOREIGN PATENT DOCUMENTS

107622 8/1976 Japan .

*Primary Examiner*—J. D. Miller
*Assistant Examiner*—Peter S. Wong
*Attorney, Agent, or Firm*—Oblon, Fisher, Spivak, McClelland & Maier

[57] ABSTRACT

A pair of switching elements are provided between a source of direct current and a bridge type inverter for commutating together. A commutating circuit having a capacitor is connected in parallel with the bridge type inverter to rapidly commutate the bridge type inverter. The commutating circuit operates so as to apply a voltage of inverse polarity to the thyristor of the inverter when a switching element operates.

7 Claims, 8 Drawing Figures

INVERTER DEVICE

BACKGROUND OF THE INVENTION

1. Field of the Invention

This invention relates to an inverter device, and more particularly to an inverter device for reducing the commutating time of the switching elements in a commutation type inverter.

2. Description of the Prior Art

The prior art commutation type inverter device is shown in FIG. 1. A D.C. power source 1 is connected through a pair of switching elements 2 and 3, such as power transistors, to a bridge type inverter circuit 4 including a plurality of thyristors which supplies A.C. power to a load 5. To feed back power from the load 5 to the D.C. power source a diode bridge 6 is connected in parallel with the D.C. Power source 1. To each base terminal of the transistors 2 and 3 signals from a well-known base signal generating device (not shown), are supplied.

The transistors 2 and 3 are in their OFF states only when the bridge type inverter circuit is caused to commutate; otherwise the transistors 2 and 3 are in their ON states.

The operation of the prior art device shown in FIG. 1 is herein described with reference to the timing diagram shown in FIG. 2.

At time $t_0$, the transistors 2 and 3 are in their ON states and the thyristors $S_3$, $S_5$ and $S_4$ of the bridge type inverter circuit 4 also are in their ON states.

At time $t_1$, to cause the thyristor $S_3$ to go into its OFF state the transistor 2 is caused to go into its OFF state. After the forward blocking voltage of the thyristor $S_3$ is recovered, both the thyristor $S_6$ and transistor 2 are caused to go into their ON states. The commutating operation is achieved by the above-mentioned steps.

The prior inverter device, however, has a defect in that it requires an extremely long time i.e. turn-off time of the thyristor, for recovery of the forward blocking voltage of the thyristor because a reverse voltage is not applied to the thyristor and the moving time of the stored charge in the thyristor is long even if either transistor 2 or 3 is caused to go into its OFF state.

It is, therefore, not favorable to use a relatively high frequency type inverter since the bridge type inverter circuit cannot commutate at a high frequency, i.e. with a short period.

SUMMARY OF THE INVENTION

Accordingly, it is one object of this invention to provide a new and improved unique inverter device in which the commutating time of the inverter circuit can be reduced and the upper limit of the operating frequency of the inverter can be raised.

Briefly, in accordance with one aspect of this invention, an inverter device is provided which includes a bridge type inverter circuit connected between a source of direct current and a load, a bridge type diode circuit connected in parallel with the bridge type inverter circuit, a pair of switching elements connected between the bridge type inverter circuit and the bridge type diode circuit, and a commutating circuit having a capacitor connected in parallel with the bridge type inverter circuit for applying the electric charge stored in the capacitor to the inverter circuit with inverse polarity when the inverter circuit is commutated.

BRIEF DESCRIPTION OF THE DRAWINGS

A more complete appreciation of the invention will be readily obtained as the same becomes better understood by reference to the following detailed description when considered in connection with the accompanying Drawings, wherein.

DETAILED DESCRIPTION OF THE PREFERRED EMBODIMENTS

Figure 3:
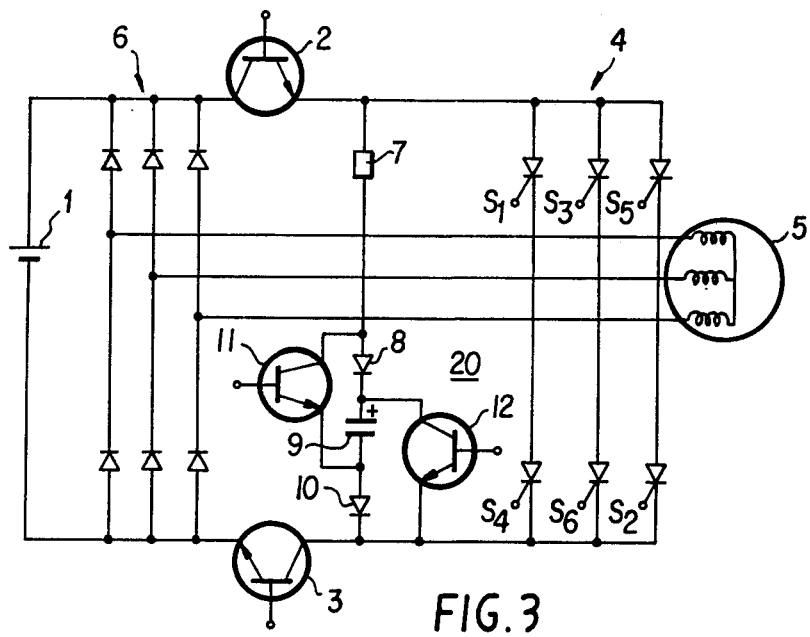
FIG. 3 is a circuit diagram of one embodiment of an inverter according to this invention.

Referring now to the Drawings, wherein like reference numerals designate identical or corresponding parts throughout the several views, and more particularly to FIG. 3 thereof, a preferred embodiment of a commutation type inverter device in accordance with this invention is shown as including a commutating circuit 20 which is connected in parallel with the bridge type inverter circuit 4.

The commutating circuit 20 includes a series circuit which comprises an impedance for limiting the current, such as a current limiting resistor 7, a first diode 8, a capacitor 9 and a second diode 10. Furthermore, a first switch, such as a transistor 11, is connected in parallel with a series circuit of the first diode 8 and the capacitor 9; and a second switch, such as a transistor 12, is connected in parallel with a series circuit of the capacitor 9 and the second diode 10.

Normally, the capacitor 9 is charged to the voltage of the D.C. power source 1 through the current limiting resistor 7, the first and second diodes 8 and 10, and a pair of power transistors 2 and 3 as indicated by the plus sign of the charge polarity.

Figure 1:
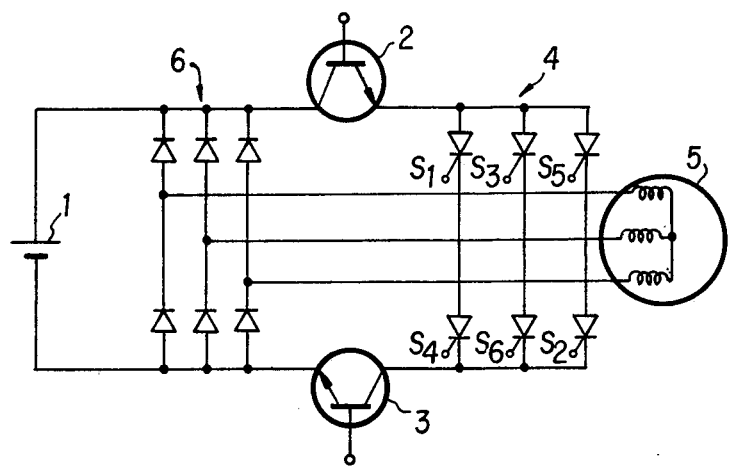
FIG. 1 is a circuit diagram of the prior art commutation type inverter.
Figure 2:
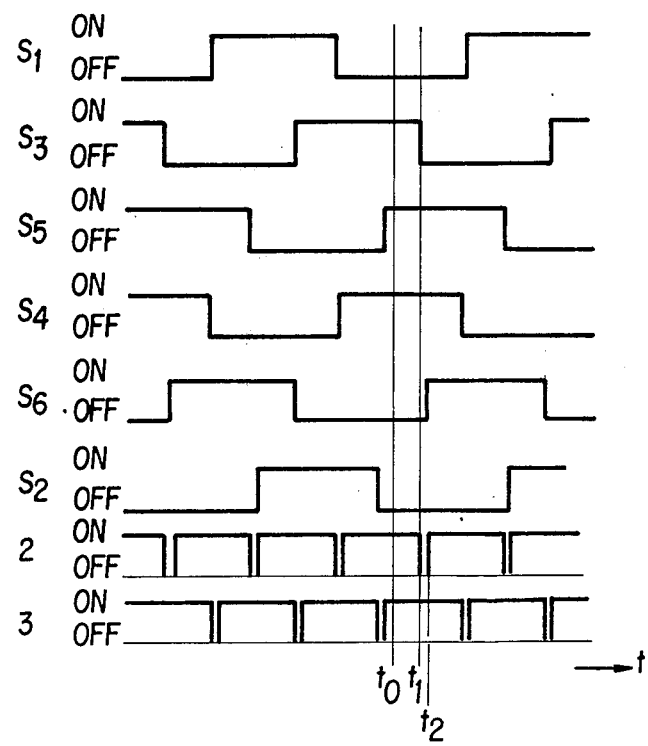
FIG. 2 is a timing diagram for explaining the operation of the inverter shown in FIG. 1.
Figure 4:
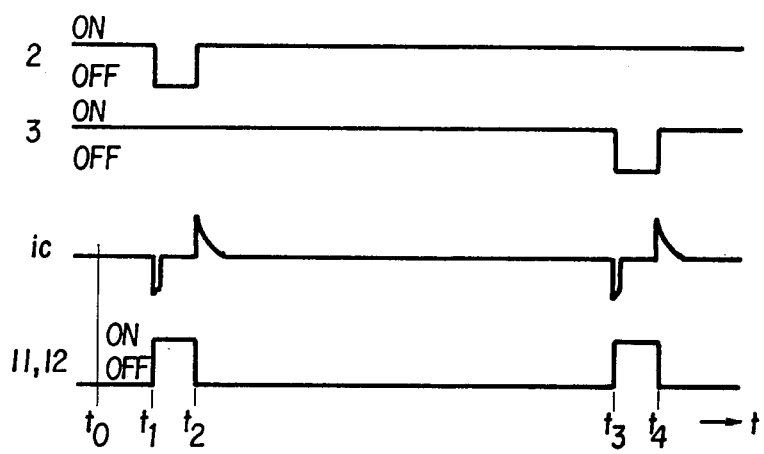
FIG. 4 is an enlarged portion of the timing diagram corresponding to the $t_0$–$t_2$ period shown in FIG. 2 for explaining the operation of this invention; and, FIGS. 5, 6, 7 and 8 show alternative embodiments of an inverter according to this invention.

The operation of the inverter device shown in FIG. 3 is explained by reference to the timing diagram of FIG. 4 showing an enlarged portion corresponding to the $t_0$–$t_2$ period shown in FIG. 2. At time $t_0$, the capacitor 9 is charged by a circuit consisting of the first power transistor 2, the current limiting resistor 7, the first diode 8, the capacitor 9, the second diode 10 and the second power transistor 3 to the voltage of the D.C. power source.

At the same time that the first power transistor 2 is caused to go into its OFF state at time $t_1$, when the first and second transistors 11 and 12 are caused to go into their ON states, the charge of the capacitor 9 is applied to the bridge type inverter circuit 4 in the inverse direction, namely, the positive side and the negative side of the capacitor 9 are respectively connected to the cathode side of the thyristors $S_4$, $S_6$ and $S_2$, and the anode side of the thyristors $S_1$, $S_3$ and $S_5$. Accordingly, capacitor 9 is discharged through the second transistor 12—the second power transistor 3—the diode of the diode bridge 6—the thyristors $S_1$, $S_3$ and $S_5$ in the inverse direction—the current limiting resistor 7—and the first transistor 11. By causing the first power transistor 2 to go into its OFF state, the thyristor $S_3$ is caused to go into its OFF state and then has applied a reverse voltage whereby the thyristor $S_3$ rapidly recovers its forward blocking voltage.

At the same time that the thyristor $S_6$ of the bridge type inverter 4 which is next to be commutated is caused to go into its ON state, when the first power transistor 2 is caused to go into its ON state the capacitor 9 is rapidly charged again by the charging current $i_C$ whereby the commutation operation is achieved.

Although the switching elements are represented with transistor symbols in FIG. 3, it is possible to employ another self turn-off type switching element, which carries out functions similar to those previously described, such as a gate turn-off thyristor, or so-called G.T.O. thyristor. Furthermore, although the bridge type inverter is represented with thyristor symbols, it is possible to employ another load, such as a single phase, poly-phase or direct-current load.

Figure 5:
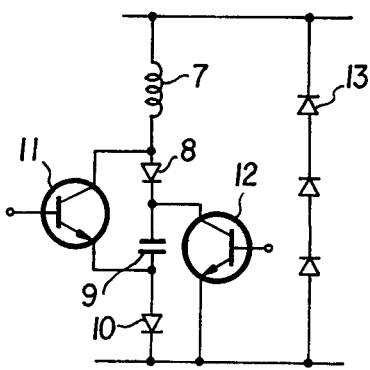

As shown in FIG. 5, it is also possible to employ a reactor 27 in place of the current limiting impedance, such as the resistor 7. With this reactor 27, it is possible to reduce the $I^2R$ generating loss. To drop the voltage applied to the power transistor, a plurality of rectifiers 13 connected in series as shown in FIG. 5 are connected in parallel with the D.C. (input) terminals of the inverter circuit 4. It is therefore possible to clip the reverse voltage coming from the inverter circuit 4 while the inverter circuit 4 is commutated and to drop the withstand voltage to the power transistors 2 and 3, and the bridge diode 6.

Figure 6:
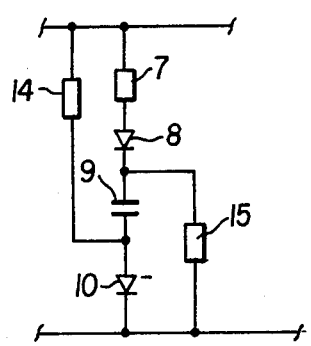

It should be readily apparent that the limiting of the voltage by the rectifier 13 is achieved by the combination of a rectifier and a resistor (not shown). Furthermore, as shown in FIG. 6 it may be possible to employ resistors 14 and 15 in a small capacity device, which does not have the loss problem, in place of the first and second switches 11 and 12. It is preferable that the value of the resistors 14 and 15 be the same as (equal to) or larger than that of the resistor 7. It should be readily apparent that the commutating operation will occur in a manner similar to that described above by using the pair of the resistors 14 and 15.

Figure 7:
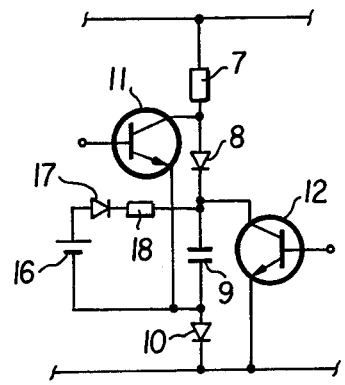

In case the voltage of the D.C. power source 1 drifts to a large degree, as shown in FIG. 7, it is possible to provide a series connected circuit, to be connected in parallel with the capacitor 9, which includes a reserved D.C. power source 16, a diode 17 and a resistor 18. It is, therefore, possible to completely commutate the bridge type inverter circuit 4.

Figure 8:
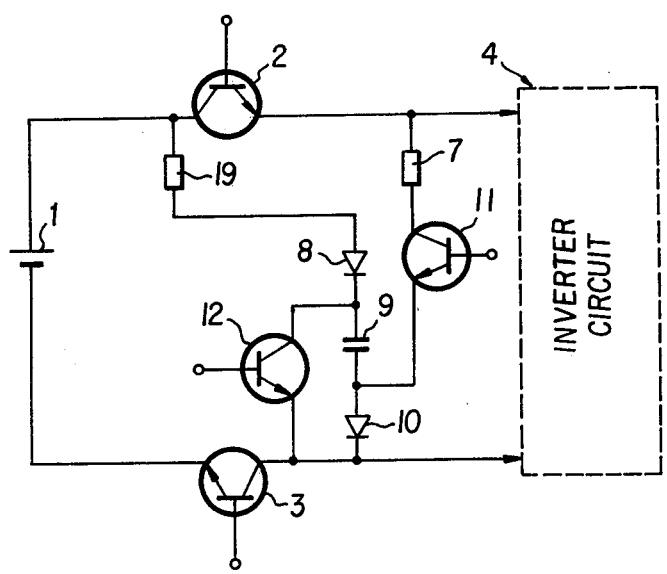

Referring now to FIG. 8, one terminal of the capacitor 9 is connected to the D.C. power source 1 through a series circuit consisting of the first diode 8 and a resistor 19. The other terminal of the capacitor 9 is connected to the input terminal of the inverter circuit 4 through a series circuit consisting of the first switch 11 and the resistor 7. In addition in FIG. 8 the diode bridge 6 is deleted. It will be apparent that the function of this embodiment shown in FIG. 8 is similar to those previously described.

According to this invention, since the reverse voltage is applied to the switching element of the inverter circuit 4, it is possible to markedly reduce the recovery time of the thyristor.

Furthermore, according to this invention by using a commutating circuit, it is possible to provide an inverter device operated at a relatively high frequency.

Obviously, many modifications and variations of this invention are possible in light of the teachings of this invention. It is therefore to be understood that within the scope of the appended claims, this invention may be practiced otherwise than as specifically described herein.

What is claimed as new and desired to be secured by letters patent of the United States is:

1. An inverter device comprising:
    a bridge type inverter circuit;
    means for connecting the bridge type inverter circuit between a source of direct current and a load;
    a bridge type diode circuit connected in parallel with the bridge type inverter circuit;
    a pair of switching means connected between the bridge type inverter circuit and the bridge type diode circuit; and
    a commutating circuit including a series circuit of a first diode, a capacitor, a second diode and means for limiting current supplied to said capacitor connected in parallel with the bridge type inverter circuit, a first switch element connected in parallel with the first diode and the capacitor and
    a second switch element connected in parallel with the capacitor and the second diode for applying electric charge stored in the capacitor to the inverter circuit with reverse polarity when the inverter circuit is commutated.

2. An inverter device according to claim 1, wherein: each of the first and second switch elements is a transistor.

3. An inverter device according to claim 1, wherein the commutating circuit further includes:
    a third diode; and
    a reserved D.C. power source connected in parallel with the capacitor through the third diode.

4. An inverter device according to claim 1, wherein: the first and second switch elements are replaced by resistors; and the resistance value of the current limiting element which is connected in series with the series circuit of the commutating circuit is equal or smaller than that of the resistors.

5. An inverter device according to claim 1, wherein: the commutating circuit is connected between a junction of the source of direct current and one of the switching means and a junction of the other switching means and the inverter and includes a series circuit of a first diode, a capacitor and a second diode, a first switch element connected in parallel with the capacitor and the second diode, and a second switch element connected between the junction of the capacitor and the second diode and the junction of the one of the switching elements and the inverter through a current limiting element.

6. An inverter device according to claim 1, wherein: each of the pair of switching means is a transistor.

7. An inverter device according to claim 1, including: a clipping circuit connected in parallel with the commutating circuit.

* * * * *